United States Patent Office 3,756,792
Patented Sept. 4, 1973

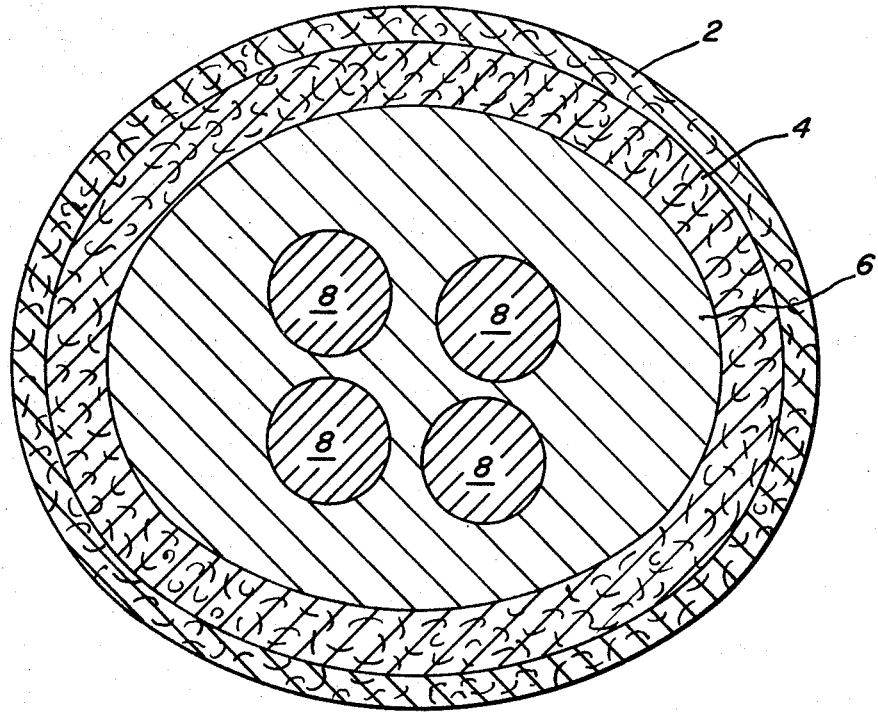

3,756,792
BABASSU SOLID FUEL PROCESS
James D. Carter and Elga M. Carter, Pittsburgh, Pa.,
assignors to Clean Air Fuels, Inc., Pittsburgh, Pa.
Filed Oct. 8, 1970, Ser. No. 79,066
Int. Cl. C10l 5/44
U.S. Cl. 44—1 R
4 Claims

ABSTRACT OF THE DISCLOSURE

A method of obtaining high thermal output from a solid fuel while resisting air pollution including providing solid fuel material consisting of a unitary or mechanically fragmented babassu nut, igniting the solid fuel material to provide a calorific output of not less than 7500 B.t.u./lb. and thereby producing a flue discharge having less than about 100 parts per million total sulfur oxides and substantially no arsenic, lead, mercury or cadmium. The method may be employed using the entire raw nut, or portions thereof such as the entire nut less the kernels thereof or solely the endocarp portion thereof.

A method of providing such a fuel by heating portions of the babassu nut at about 200 to 1200° C. for about 0.25 to 4 hours. The method may be preferably employed with substantially all of the portions of the babassu nut being taken from the endocarp with or without kernel retention and heating effected at about 200 to 600° C. for about 0.75 to 4 hours and preferably 250 to 400° C. for about 1.5 to 3 hours.

A non-contaminating carbonaceous fuel obtained through thermal treatment of the babassu nut including about 50 to 90% fixed carbon, about 5 to 45% volatile matter, about 2.5 to 4.25% ash, about 0.015 to 0.1% sulfur and less than about 10% moisture and having a calorific value of about 11,000 to 14,000 B.t.u./lb. A preferred form of the thermally prepared fuel consists substantially completely of the endocarp portion of the babassu nut thermally treated to drive off portions of the volatile matter contained therein, with the resultant product weighing about 25 to 40% of the product prior to thermal treatment.

BACKGROUND OF THE INVENTION

Field of the invention

This invention relates to a process of providing and using a high thermal energy solid fuel with effective reduction in significant air pollutants. More specifically, it relates to a system for economically providing such a fuel, the use of which meets or exceeds contemporary air pollution control standards.

Prior art

One of the major problems confronting industrially progressive countries is that of attempting to prevent undesirable air pollution while not unduly impeding industrial progress. As the problems have been permitted to reach serious proportions in many areas, immediate and severe action is necessary. Unfortunately the principal fuels employed in certain industrial applications contribute substantial amounts of a number of pollutants to the air. Pollutants such as sulfur oxides (the principal constituents of which are sulfur dioxide and surfur trioxide), and solid particulate materials such as fly ash, not only destroy vegetation and otherwise create an environmental imbalance, but produce a substantial risk of impairment of the health of both humans and animals, as well as harm to plant life and property.

The problem has become sufficiently severe that various federal, state and local governments have expended large amounts of money with a view toward ascertaining the most effective means of promptly solving the air pollution problems without crippling the industries which contribute to the pollution.

With respect to installations requiring a solid fuel which is relatively inexpensive, there has been limited available substitutes which could be employed. In view of the absence of a feasible substitute fuel, many companies have been forced to consider capital investment in very expensive equipment such as electrostatic precipitators and scrubbers which are designed to remove portions of the contaminants from the flue discharge prior to release of the exhaust gases into the atmosphere. These costs are very substantial, but as more and more jurisdictions enact legislation placing absolute ceilings on the quantities of the various contaminants which may be discharged into the air, often industry is faced with a choice of making such an investment or closing down one or more installations. Also, where such postcleaning equipment is employed, disposal of the accumulated removed pollutants becomes a problem. In view of the relatively advanced stage of contamination which exists in many areas, legislation has often required compliance within such a short period of time that numerous companies fully willing to make a substantial investment in flue discharge cleaning equipment and/or expensive solid fuel pretreatment equipment have been given insufficient time to design or acquire and introduce such changes. As a result, these companies have had to seek temporary variances which excuse technical violations of the law until the changes could be accomplished.

One of the most commonly employed commercial solid fuels is coal. Coal comes in various grades possessing a wide range of properties with the type selected for a given use dependent upon the technical needs and economic limitations. Steam coal which is relatively high in volatile constituents is frequently employed by utilities. Metallurgical grade coal, which is substantially more expensive; is lower in volatile constituents. The recently enacted stringent air pollution codes have resulted in industry being confronted with the need to install very expensive equipment to remove undesired pollutants from flue discharge or in the alternative give consideration to the use of fuels possessing reduced contaminants which fuels tend to be expensive. These factors have placed a significant additional consideration in the selection of a fuel. One of the prime air pollutants which is being regulated is sulfur dioxide. Coal, for example, may generally be considered to contain sulfur in the range of about 0.4 to 5%. Coal within the lower ranges is relatively scarce and as a result very expensive. While it may be mixed with some high sulfur coals to effect a partial reduction in sulfur content, economics prohibit reduction of sulfur to a very low level by this means. As about 95% of the sulfur content of a fuel will be converted to sulfur dioxide on burning, the sulfur content of the fuel is directly related to the sulfur dioxide emission from the burning of a given fuel. Also, as desirable coal is a mineral resource which is in short supply it has, as a result, significantly increased in price. In addition, with the ever increasing demands it will ultimately become depleted.

Other typical constituents of coal in general commercial use include about 40 to 65% carbon, 20 to 40% volatiles and 10 to 25% ash. This relatively high ash content, to the extent that it becomes fly ash, contributes to the particulate form of air contamination.

Typical of the type of state laws restricting solid fuel constituents is that of the state of Maryland which prohibits the use in fuel burning equipment at an installation where the total heat output exceeds 100 million B.t.u./hr. of any fuel containing more than 1% sulfur by weight. Another example of the tightening of standards regarding air pollution is that of the St. Louis Metropolitan Area which provides for installations having a capacity of less than 2,000 million B.t.u./hr. that coal containing more than 2.0% sulfur could not be burned.

There remains, therefore, the serious problem confronting industry of attempting to profitably continue to engage in business while complying with the legal standards relating to air pollution. In addition, as a result of the potentially serious health hazards resulting from air contamination, industry has in general recognized a moral obligation to seek effective means for controlling air pollution. As has been stated above, the two primary approaches, i.e., equipment for post treatment of flue gases or the purchase of more expensive low sulfur coal and mixing it with the more common coal, have in general been economically burdensome. While attempts have been made to locate suitable alternate fuels which would be both practical and economically feasible, to date none have been found. See Fuel, Solid, Liquid and Gaseous by Brame and King, Edward Arnold Publishers Ltd., London (5th edition), pp. 38, 40 and 41.

It has been suggested that a coke product made from wood might provide a suitable solution. U.S. Pat. 2,184,317 discloses such a product and points out the fact that among other difficulties, such products tend to be excessively friable. As a result of this distinct disadvantage, the wood coke product results in the production of a substantial amount of dust-like material which increases with handling, transport and use. While this patent proposes a method of strengthening such a wood product through a preliminary thermal treatment and briquetting process employing binder materials, such an approach, even if successful, would add to the cost of production as it must be followed by a very high temperature coking operation.

The babassu nut which grows on the babassu palm tree (*Orbignya martiana* and *Orbignya oleifera*) has been used commercially in the past solely for the crude oil contained within the kernels thereof and the remaining portions of the nut have been relegated to the status of a waste product, portions of which have been occasionally employed for the feeding of animals. While the literature does contain a reference to one experimental fuel use of the product to power a boat, there is no indication as to whether the entire nut or portions thereof were used, whether or not they were pretreated thermally or in other fashions or whether it was comingled with other materials in the use. There have also been occasional published references to the experimental production of a coked form of the babassu nut, but these contain no disclosure as to how the product was prepared or its full properties, compositions and capabilities. None of these prior limited disclosures contain any reference whatsoever to the problem of air pollution or any suggestion that the babassu nut in any form could be a key to the solution of such problems.

There remains, therefore, the very serious unsolved problem of the absence of an economical solid fuel process and material which will effectively contribute to marked reduction in air pollution in numerous industrial applications.

SUMMARY OF THE INVENTION

This invention has solved the above-discussed serious problem by providing an economical solid fuel which will substantially reduce or eliminate the major sources of air pollution while providing a high energy fuel and eliminating the need for the purchase of equipment to pretreat solid fuels, to post treat emerging flue gases and minimize ash disposal problems. The process of this invention includes employing the babassu nut as a solid fuel material and igniting the same to produce a calorific output of not less than 7500 B.t.u./lb. while resulting in a flue discharge having less than 100 parts per million total sulfur oxides, and substantially no arsenic, lead, mercury or cadmium. The babassu nut may be mechanically partially opened or fragmented prior to fuel use in order to improve burning efficiency. In a preferred form the fuel used consists solely of the endocarp or inner portion of the nut with or without the kernels contained therein being used.

The fuel is preferably thermally pretreated to drive off a certain proportion of the lower boiling point volatile constituents. The portions of the nut which are to be employed as a fuel may be heated to about 200 to 1200° C. for a period of about 0.25 to 4 hours to provide a carbonaceous solid fuel product containing about 0.02 to 0.10% sulfur. In a preferred form of thermal treatment the portion of the nut treated is limited to the endocarp with or without the kernels and this is heated at a temperature of about 200 to 600° C. for about 0.75 to 4 hours and preferably at about 250 to 400° C. for about 1.5 to 3 hours. This preferred treatment produces a product containing about 0.02 to 0.04% sulfur. In general, the thermally treated endocarp will have a remaining composition of about 50 to 75% fixed carbon, about 20 to 45% volatile matter, about 3 to 4% ash and less than about 7% moisture. The small percentage ash contributes to a substantial reduction in particulate material which could potentially become entrained within the emerging flue gases.

The invention also contemplates an air pollution resisting solid carbonaceous fuel comprising about 50 to 90% fixer carbon, about 5 to 45% volatile matter, about 2.5 to 4.25% ash, about 0.015 to 0.1% sulfur and less than about 10% moisture. The fuel contains a calorific value of about 11,000 to 14,000 B.t.u./lb. In a preferred form the product comprises about 55 to 70% fixed carbon, about 25 to 40% volatile matter, about 3 to 4% ash and about 0.02 to 0.04% sulfur, with a major portion of the ash being silicon dioxide and a major portion of the fuel being made from the babassu nut. The weight of the resultant coked thermally treated product is about 25 to 40% of the raw product prior to pretreatment.

It is an object of the invention to provide a process for the industrial use of a high calorific value solid fuel, the burning of which effectively reduces significant air pollution through the emerging flue gases.

It is another object of this invention to provide such a process employing the babassu nut as an economical solid carbonaceous fuel product which will effectively reduce the amounts of sulfur dioxide and fly ash.

It is another object of the invention to provide a thermally treated carbonaceous product having superior friability and obtained from the babassu nut which product is adapted for economical use as a solid fuel which effectively minimizes air pollution.

It is a further object of this invention to provide such a thermally treated fuel product employing certain preferred portions of the nut.

These and other objects and advantages of this invention will be understood from the following description of the invention on reference to the illustration appended hereto.

BRIEF DESCRIPTION OF THE DRAWING

The drawing illustrates a cross sectional representation taken through the center of a babassu nut.

DESCRIPTION OF THE PREFERRED EMBODIMENTS

Referring now more specifically to the drawing, the sectional representation of the babassu nut shows the distinct portions thereof. The nut has an outer shell 2 (the epicarp or epicarpo), an intermediate shell 4 (the mesocarp or mesocarpo) and an inner portion 6 (the endocarp or endocarpo). Contained within the endocarp 6 are a number of kernels 8. On an average weight basis the typical babassu consists of about 6% kernel, 65 to 76% endocarp, 15 to 16.5% mescocarp and about 3 to 8.5% epicarp. For convenience of reference herein use of the term "endocarp" or "endocarpo," unless expressly indicated to the contrary, shall refer to the endocarp 6 containing the kernels 8 and not devoid of the kernels 8.

The term "air pollution" as used herein shall refer to the presence in the outdoor atmosphere of substances in quantities, having characteristics or being of a duration which are or may be predicted with reasonable certainty to be injurious to human, plant or animal life or to property or which is likely to unreasonably interfere with the proper enjoyment of property by others by reason of emission of odors, solids, vapors, liquids or gases.

The term "flue gases" as employed herein shall refer to all gases which leave the combustion chamber by way of the flue including gaseous products of combustion, water vapor, excess oxygen and nitrogen and entrained solid and liquid matter.

As has been mentioned above, the primary thrust of this invention is directed toward the solution of a significant pollution problem by the use of a specific nut which in a preferred form is employed only in part and is thermally treated to drive off water vapor and a certain portion of the lower boiling point volatile constituents. We have discovered that the babassu nut which grows on the babassu palm tree (*Orbignya martiana* and *Orbignya oleifera*) provides substantial unexpected benefits in solving this problem. The babassu nut which in general may be considered to be roughly about ¼ to ⅓ the size of a coconut may be produced in quantities of 600 to 1,000 per palm tree. A tree when the harvest is picked will under proper conditions produce an entirely new crop each year.

This nut may be employed intact in its entirety as a substitute for coal and/or coke as presently employed in such industries as public utilities and metallurgical industries. It preferably is subjected to a process which mechanically fractures the exterior shell or mechanically fragments the product to provide for more efficient thermal treatment and/or burning. It provides an effective fuel with a calorific output of not less than about 7500 B.t.u./lb. while producing a flue discharge having 100 parts per million sulfur oxides, and substantially no arsenic, lead, mercury or cadmium. In a preferred form the epicarp and mesocarp are substantially completely discarded and the endocarp is used alone either with or without the kernels. If desired, the endocarp, mesocarp and epicarp may all be used without the presence of the kernels or other combinations of the various components may be employed. It has been found that the endocarp in the raw or thermally treated form has superior friability as compared with other portions of the nut. This mechanical property makes the endocarp particularly suitable for certain industrial uses such as in spreader stokers and underfired stoker boilers, for example. It is, for this reason, preferred in certain uses to employ solely the endocarp with or without the kernels.

While the substantial benefits described above may be obtained by employing the raw babassu nut in whole or in part, it is preferred to thermally pretreat the product in order to drive off a portion of the water vapor and at least some of the lower boiling point volatile constituents, and thereby increase the calorific value of the fuel. This also facilitates ready pulverization for certain end uses such as pulverized coal boilers, for example. Such a process may be carried out by heating the portions of the babassu nut to be used at about 200 to 1200° C. for about 0.25 to 4 hours in order to provide a thermally treated product having an improved calorific value. In one preferred form of the invention, a product consisting substantially completely of the endocarp is thermally treated in this fashion to provide a solid fuel composition having about 50 to 75% fixed carbon, about 20 to 45% volatile matter, about 3 to 4% ash, about 0.02 to 0.10% sulfur and not more than 10% moisture. In another preferred form the endocarp is treated with or without the presence of kernels for about 0.75 to 4 hours at about 200 to 600° C. and preferably at about 250 to 400° C. for about 1.5 to 3 hours. The resultant thermally treated product generally has a weight of about 25 to 40% of the raw product prior to treatment.

In order to confirm the effectiveness of this thermal treatment in producing an air pollution resistant high energy solid carbonaceous fuel several tests were performed. The results of these tests are set forth in the following examples.

Example 1

A 50 gram portion of the endocarp of a babassu nut was placed in a 300 milliliter retort at room temperature. The retort temperature was gradually increased. At 70° C. visible moisture vapor condensate began to emerge from the specimen. Ten minutes after the heating was initiated, the retort temperature was 100° C. and tar and water vapors were collected by distillation. A temperature of 196° C. was reached one hour after initiation of heating. During this period, vapors continued to emerge from the specimen until a temperature of 180° C. was reached. The specimen was then permitted to remain in the retort for an additional ten minutes during which the temperature was reduced to 138° C. The thermally treated product weighed 14.9 grams. Chemical analysis revealed the following composition of the thermally treated product: moisture 2.96%, volatile matter 24.32%, fixed carbon 68.74%, ash 3.98% and sulfur 0.03%. The resultant product had a calorific value of 13,034 B.t.u./lb. On a dry basis the specimen was found to have 25.06% volatile matter, 70.84% fixed carbon, 4.10% ash and 0.03% sulfur with a calorific value of 13,432 B.t.u./lb. The extremely low sulfur and ash values combine with the volatile and fixed carbon values to produce a highly effective fuel with low sulfur dioxide and particulate flue discharge constituents. In addition, other undesirable contaminants such as the heavy metals would be absent.

Example 2

Ffity grams of the endocarp were placed in a 300 milliliter retort at room temperature. The temperature of the retort was elevated to 300° C. in 10½ minutes and reached 375° C. in 13 minutes. The specimen was then permitted to remain in the retort for an additional 10 minutes during which the temperature was reduced to 130° C. The resultant thermally treated product weighed 14.9 grams which approximates a thirty percent yield on a weight basis. Chemical analysis of the resultant product revealed the following composition: moisture 2.86%, volatile matter 38.79%, fixed carbon 54.28%, ash 4.07%, sulfur 0.03% and a calorific value of 12,572 B.t.u./lb. On a dry basis the composition was volatile matter 39.93%, fixed carbon 55.88%, ash 4.19%, sulfur 0.03% and calorific value 12,942 B.t.u./lb. The shorter period of heating at higher temperatures as compared with Example 1 produced a product having substantially the same low ash and sulfur constituent, but a higher volatile constituent and a lower fixed carbon constituent. The calorific value was slightly lower than the product in Example 1.

Example 3

A fifty gram specimen consisting of the endcoarp was placed in a 300 milliliter retort at room temperature. The temperature of the retort was elevated to 300° C. in 14 minutes. The specimen remained in the retort for an additional ten minutes during which the temperature was reduced to 130° C. The specimen was then removed. Twenty grams of the resultant product was produced. Chemical analysis of this specimen produced a composition consisting of moisture 2.41%, volatile matter 41.66%, fixed carbon 53.15%, ash 2.78% and sulfur 0.03%. The calorific value was 11.513 B.t.u./lb. On a dry basis the chemical composition was volatile matter 42.69%, fixed carbon 54.46%, ash 2.85% and sulfur 0.03% with a calorific value of 11,797 B.t.u./lb. Thus, a higher volatile thermally treated product having slightly reduced calorific value and reduced fixed carbon may be provided while reducing the ash constituent and maintaining the low sulfur constituent.

Example 4

A quantity of endocarp is placed in an oven maintained at a substantially constant temperature of about 400° C. and is retained in the oven for a period of about 3 hours. The thermal treatment may be accomplished either in a reduced air environment or in the presence of a normal air environment. After this treatment the endocarp is removed from the oven and permitted to cool. The resultant solid fuel product may be mechanically fragmented prior to use. The product will possess a sulfur content of less than 0.1% and a calorific value of greater than 11,000 B.t.u./lb.

These examples show that thermally treated products made from the babassu endocarp may be produced with a wide range of thermal and chemical properties as desired for the particular solid fuel needs of a given application, while retaining the capability of producing an absolute minimum of air contaminants. As has been stated above, these products possess desired friability characteristics. Also, the strict standards established by the various air pollution codes may be satisfied without the need for expensive pretreatment of the fuel or post treatment of the flue discharge gases prior to release.

The thermal treatment process of the babassu nut or portions thereof may be carried out at a varying temperature within the ranges described above and for varying times. Examples 1 through 3 are illustrative of this approach. In addition, and generally more practical in the terms of industrial installations, as is illustrated in Example 4, the thermal treatment process may be carried out at a substantially constant temperature. The treatment may be effectively accomplished at a temperature of 200 to 1200° C. for a period of 0.25 to 4 hours with the environment preferably being of reduced air content if the temperature exceeds 1000° C. The treatment may be effected at about 200 to 600° C. for about 0.75 to 4 hours and preferably at about 250 to 400° C. for about 1.5 to 3 hours with or without a reduced air environment. The heating temperature and time will be determined primarily by the final product characteristics which one desires. Increasing temperature or time will tend to result in driving off increased quantities of water vapor and volatile materials. As was shown in the above examples, a resultant product with a relatively low volatile matter constituent will have a relatively higher fixed carbon constituent, a higher calorific value and may have a slightly lower ash constituent. Thus, the volatile constituents coming off are of lower calorific value than the remaining fixed carbon. This treatment is preferably performed in an atmosphere which is substantially air-free when temperatures of about 1000 to 1200° C. are used. At such temperatures, in the presence of air which contains combustion supporting oxygen, portions of the nut will be ignited and burn away during the thermal treatment. In some instances it may be advantageous to permit such burning as where the entire raw fruit is to be processed and it is desired to eliminate portions of the epicarp and mesocarp by this burning action. The product may, however, be thermally treated under normal conditions with air present. The presence of air will result in no detrimental effect at lower temperatures.

The ash content of this product consists in major portions of silicon dioxide. The ash constituent is very low and as a result of its chemical matter will contribute only in a very inconsequential degree to the solid particulate emerging from the discharge flue. The material has a fusion temperature of about 1500° C.

The air contamination resisting product produced by the thermal treatment of this invention has a composition of about 50 to 90% fixed carbon, about 5 to 45% volatile matter, about 2.5 to 4.25% ash, about 0.015 to a maximum of 0.1% sulfur and less than about 10% moisture. The calorific value will be about 11,000 to 14,000 B.t.u./lb. In the preferred treatment employment primarily or solely the endocarp with or without kernels, the resultant product will have about 55 to 70% fixed carbon, about 25 to 40% volatile matter, about 3 to 4% ash, about 0.02 to 0.04% sulfur and less than about 7% moisture.

It will therefore be appreciated that, in view of the foregoing, we have provided an economical process for substantially reducing air pollution by means of the use of the babassu nut in its entirety or in our preferred form use of the endocarp with or without the kernels thereof. Unlike mineral fuels which are capable of ultimate depletion, the babassu being a form of vegetation is capable of perpetual replenishment. The preferred form of the invention provides for thermal treatment of the nut or nut portions in order to drive off desired quantities of water vapor and volatile constituents and impart desirable physical properties to the product. The resultant product possesses desired mechanical strength for various industrial uses and provides a sufficiently high energy fuel. In the thermally treated form, which is a preferred form, the calorific value is very substantial. As a result of this development, the need for pretreatment of the fuel product or post treatment of the flue discharge gases prior to release into the atmosphere is eliminated. These treatments may, however, be employed if desired, All of this is accomplished while permitting compliance with the various governmental codes regarding air pollution. Particularly obnoxious materials such as sulfur dioxide, fly ash and heavy metal constituents which are injurious to the health of humans and animals as well as damage to plants and property and destruction of natural beauty are effectively reduced by the use of this fuel and process.

Whereas particular embodiments of the invention have been described above for purposes of illustration, it will be apparent to those skilled in the art that numerous variations of the details may be made without departing from the appended claims.

We claim:
1. A method of providing a non-contaminating carbonaceous solid fuel including
heating portions of the babassu nut at about 200 to 1200° C. for about 0.25 to 4 hours to provide a thermally treated solid fuel containing about 0.02 to 0.10% sulfur and a calorific value of about 11,000 to 14,000 B.t.u./lb.
2. The method of claim 1 including
substantially all of said portions of said babassu nut which are so heated are the endocarp, and
said heating of said portions effected at about 200 to 600° C. for about 0.75 to 4 hours.
3. The method of claim 2 including
said heating is effected at about 250 to 400° C. for about 1.5 to 3 hours,
prior to heating said endocarp removing the kernels therefrom,
the weight of said thermally treated product is about 25 to 40% of the endocarp prior to heating, and
said thermally treated product has a sulfur content of about 0.02 to 0.04% sulfur.
4. The method of claim 1 wherein
said fuel comprises the endocarp, mesocarp and epicarp of said babassu nut but not the kernels thereof.

References Cited

"Briquetting," by Stillman, The Chemical Publishing Co., Easton, Pa., 1923, p. 7.

"Briquettes & Patent Fuel," by Bjorling, London, 1903, pp. 189 and 156.

CARL D. DEES, Primary Examiner

U.S. Cl. X.R.

44—1F, 1 D